US010697408B2

(12) United States Patent
Asanuma et al.

(10) Patent No.: US 10,697,408 B2
(45) Date of Patent: Jun. 30, 2020

(54) VEHICLE GAS PROCESSING DEVICE

(71) Applicant: AISAN KOGYO KABUSHIKI KAISHA, Obu-shi (JP)

(72) Inventors: Daisaku Asanuma, Gamagori (JP); Masanori Sugiura, Toyoake (JP)

(73) Assignee: AISAN KOGYO KABUSHIKI KAISHA, Obu-Shi, Aichi (JP)

( * ) Notice: Subject to any disclaimer, the term of this patent is extended or adjusted under 35 U.S.C. 154(b) by 0 days.

(21) Appl. No.: 16/084,385

(22) PCT Filed: Feb. 20, 2017

(86) PCT No.: PCT/JP2017/006193
§ 371 (c)(1),
(2) Date: Sep. 12, 2018

(87) PCT Pub. No.: WO2017/159227
PCT Pub. Date: Sep. 21, 2017

(65) Prior Publication Data
US 2019/0072061 A1 Mar. 7, 2019

(30) Foreign Application Priority Data
Mar. 15, 2016 (JP) .................. 2016-051525
Jul. 29, 2016 (JP) .................. 2016-150041

(51) Int. Cl.
F02M 35/10 (2006.01)
F02M 35/16 (2006.01)

(52) U.S. Cl.
CPC ..... F02M 35/10209 (2013.01); F02M 35/10006 (2013.01); F02M 35/1038 (2013.01);
(Continued)

(58) Field of Classification Search
CPC ....... F02M 35/10209; F02M 35/10006; F02M 35/10157; F02M 35/10255; F02M 35/16; F02M 35/10222; F02M 26/00
See application file for complete search history.

(56) References Cited

U.S. PATENT DOCUMENTS 5,400,759 A    3/1995 Ishida
6,550,315 B2   4/2003 Streib
(Continued)

FOREIGN PATENT DOCUMENTS

JP   H6-066213 A    3/1994
JP   H06-129244 A   5/1994
(Continued)

OTHER PUBLICATIONS

International Search Report (ISR) for PCT/JP2017/006193 dated Apr. 25, 2017 (5 pages with English Translation).
(Continued)

Primary Examiner — Kevin A Lathers
(74) Attorney, Agent, or Firm — Shumaker, Loop & Kendrick, LLP

(57) ABSTRACT

A vehicle gas processing device is configured to supply gas generated by a vehicle to an intake pipe of a combustion engine. The device may includes: a gas pipe configured to communicate a gas generation source to the intake pipe, the gas pipe having a flexible end at least at an intake pipe side of the gas pipe; a check valve disposed between the intake pipe and the gas pipe, and configured to allow the gas to flow from the gas pipe toward the intake pipe and prohibit the gas to flow from the intake pipe toward the gas pipe; and a determining unit configured to determine that the gas pipe is detached from the check valve. The check valve is fixed to the intake pipe, and the gas pipe is detachably attached to the check valve.

4 Claims, 13 Drawing Sheets

(52) U.S. Cl.
CPC ............... *F02M 35/10157* (2013.01); *F02M 35/10255* (2013.01); *F02M 35/16* (2013.01)

(56) References Cited

U.S. PATENT DOCUMENTS

| | | | |
|---|---|---|---|
| 7,055,375 B2 | 6/2006 | Ishikawa | |
| 7,080,547 B2 | 7/2006 | Beyer et al. | |
| 2005/0022795 A1* | 2/2005 | Beyer | F01M 11/10 123/516 |
| 2005/0161029 A1* | 7/2005 | Ishikawa | F02D 41/0065 123/568.16 |
| 2013/0199504 A1* | 8/2013 | Takeishi | F02M 25/0809 123/520 |
| 2014/0076249 A1* | 3/2014 | Rollinger | F01M 11/00 123/41.86 |
| 2014/0251284 A1* | 9/2014 | Plymale | F02M 25/089 123/518 |

FOREIGN PATENT DOCUMENTS

| | | |
|---|---|---|
| JP | H10-213022 A | 8/1998 |
| JP | 2001-227415 A | 8/2001 |
| JP | 2002-004959 A | 1/2002 |
| JP | 2002-202008 A | 7/2002 |
| JP | 2002-349357 A | 12/2002 |
| JP | 2004-332726 A | 11/2004 |
| JP | 2005-207237 A | 8/2005 |
| JP | 2008-095564 A | 4/2008 |
| JP | 2010-031688 A | 2/2010 |

OTHER PUBLICATIONS

Written Opinion of the International Searching Authority of PCT International App. No. PCT/JP2017/006193 dated Apr. 25, 2017 with English Translation (13 pages.).

Office Action (English Translation) for JP Pat. App. No. 2016-150041 dated Oct. 1, 2019 (6 pages).

* cited by examiner

VEHICLE GAS PROCESSING DEVICE

TECHNICAL FIELD

The description herein relates to a gas processing device mounted in a vehicle, and especially relates to the gas processing device for supplying gas generated by the vehicle to an intake pipe of a combustion engine.

BACKGROUND

JP 2002-349357 A describes a device that determines an abnormality in an exhaust gas recirculation system (hereinbelow termed "EGR system" (EGR being an abbreviation of Exhaust Gas Recirculation)) of a combustion engine. The EGR system has an EGR pipe arranged between an exhaust pipe and an intake pipe of the combustion engine. An EGR valve that opens and closes the EGR pipe is arranged on the EGR pipe.

A part of gas discharged to the exhaust pipe from the combustion engine is supplied to the intake pipe through the EGR pipe. A throttle portion is disposed at a connecting portion between the EGR pipe and the exhaust pipe. Thus, the throttle portion restricts gas flow rate in a case where the EGR pipe and the exhaust pipe are connected normally. On the other hand, in a case where the EGR pipe is detached from the exhaust pipe, the EGR pipe comes to be in a state of communicating with open air without intervention of the throttle portion. As a result, a pressure in the intake pipe changes between the case where the EGR pipe and the exhaust pipe are connected normally (that is, the case where the gas is supplied to the intake pipe through the throttle portion) and the case where the EGR pipe and the exhaust pipe are not connected normally (that is, the case where the air is supplied to the intake pipe without the intervention of the throttle portion). In the exhaust gas recirculation system of the combustion engine, a determination is made on whether the EGR pipe and the exhaust pipe are connected normally or not based on the change in the pressure in the intake pipe.

Problem to be Solved

The above technique does not give consideration to a situation where gas flows backward from the intake pipe toward a gas generation source of the vehicles (which is the combustion engine in the above technique) through a gas pipe (which is the EGR pipe in the above technique). The description herein provides a technique that prevents a backward flow from an intake pipe to a gas pipe in a configuration that determines whether the gas pipe is detached or not.

SUMMARY

Solution to Problem

The present disclosure discloses a vehicle gas processing device configured to supply gas generated by a vehicle to an intake pipe of a combustion engine. The device may comprise: a gas pipe configured to communicate a gas generation source to the intake pipe, the gas pipe having a flexible end at least at an intake pipe side of the gas pipe; a check valve disposed between the intake pipe and the gas pipe, and configured to allow the gas to flow from the gas pipe toward the intake pipe and prohibit the gas to flow from the intake pipe toward the gas pipe; and a determining unit configured to determine that the gas pipe is detached from the check valve. The check valve may be fixed to the intake pipe, and the gas pipe may be detachably attached to the check valve.

In the above configuration, the check valve fixed to the intake pipe is arranged at a connecting portion between the intake pipe and the gas pipe. Due to this, the gas may be prevented from flowing back from the intake pipe to the gas pipe. According to this configuration, when the gas pipe detaches from the check valve, the gas pipe comes to be directly communicated with open air. As a result, an air amount supplied to the combustion engine and a pressure in the gas pipe change. The determining unit uses these changes to determine that the gas pipe is detached from the check valve. In a configuration where the check valve is not fixed to the intake pipe, the check valve is arranged at a midpoint of the gas pipe, and the gas pipe is detachably attached to the intake pipe, the air does not flow into the gas pipe by the check valve even if the gas pipe detaches from the intake pipe. As a result, the air amount supplied to the combustion engine and the pressure in the gas pipe do not change, so the detachment of the gas pipe from the intake pipe cannot be determined even using these changes.

The gas pipe may branch into an upstream branch pipe and a downstream branch pipe at a point between the gas generation source and the intake pipe, the upstream branch pipe being connected to the intake pipe at an upstream side of a throttle valve, the downstream branch pipe being connected to the intake pipe at a downstream side of the throttle valve. The upstream branch pipe may have flexibility and may be detachably attached to the check valve. According to this configuration, the gas may be supplied to both upstream and downstream of the throttle valve.

The determining unit may be configured to determine that the upstream branch pipe is detached from the check valve, in a case where the intake pipe has a negative pressure on the downstream side of the throttle valve, and an air-fuel ratio of the engine is leaner than a reference ratio. In this configuration, when the upstream branch pipe detaches from the intake pipe, the upstream branch pipe becomes open to air. In the case where the intake pipe has the negative pressure on the downstream side of the throttle valve, the air is supplied to the intake pipe from the upstream branch pipe through the downstream branch pipe. As a result, a large amount of air is supplied to the combustion engine and the air-fuel ratio becomes lean. According to this configuration, the determining unit may determine that the upstream branch pipe is detached from the check valve in the case where the air-fuel ratio of the combustion engine is leaner than the reference ratio.

The device may further comprise a sensor configured to detect a pressure inside the gas pipe. The determining unit may be configured to determine the gas pipe is detached from the check valve using the pressure detected by the sensor. In a state where the gas is supplied to the intake pipe from the gas pipe through the check valve, a passage area of the gas pipe is narrowed by the check valve, by which the pressure of the gas in the gas pipe becomes relatively high. On the other hand, when the gas pipe detaches from the check valve, the pressure in the gas pipe drops by the gas pipe being opened to the air. Due to this, the gas pipe being detached from the check valve can be determined using the pressure in the gas pipe.

The vehicle gas processing device may further comprise an electric pump disposed on the gas pipe. The determining unit may be configured to determine whether the gas pipe is detached from the check valve using electric power supplied to the electric pump and an output of the electric pump.

When the gas pipe detaches from the check valve, the gas pipe is opened to the air and the pressure in the gas pipe changes. Due to this, in the electric pump arranged in the gas pipe, a relationship between the supplied electric power and an output of the electric pump changes. Due to this, the relationship between the supplied electric power and the output of the electric pump may be used to determine that the gas pipe is detached from the check valve.

The present disclosure discloses another vehicle gas processing device configured to supply gas generated by a vehicle to an intake pipe of an engine. The device may comprise: a gas pipe configured to communicate a gas generation source to the intake pipe, the gas pipe having a flexible end at least at an intake pipe side of the gas pipe; a check valve disposed between the intake pipe and gas pipe and configured to allow the gas to flow from the gas pipe toward the intake pipe and prohibit the gas to flow from the intake pipe toward the gas pipe; a determining unit configured to determine whether the gas pipe is detached from the check valve; and a switch valve configured to switch between a communication state in which the gas generation source and the intake pipe are communicated through the gas pipe and a non-communication state in which the gas generation source and the intake pipe are not communicated through the gas pipe. The check valve may be fixed to the intake pipe. The gas pipe may be detachably attached to the check valve. The determining unit may be configured to detect a pressure variation in the gas pipe between the gas generation source and the switch valve. A controller may determine whether the gas pipe is detached from the check valve using the detected pressure variation in the gas pipe between the gas generation source and the switch valve when the communication state and the non-communication state are switched consecutively by the switch valve.

In the above configuration, the check valve fixed to the intake pipe is arranged at the connecting portion between the intake pipe and the gas pipe. Due to this, the gas may be prevented from flowing back from the intake pipe to the gas pipe. Further, in a case of switching from the non-communication state to the communication state by the switch valve, the pressure in the gas pipe on a gas generation source side of the switch valve varies in accordance with the pressure in the gas pipe on an intake pipe side of the switch valve. In a case where the gas pipe is not detached from the check valve, the pressure in the gas pipe on the intake pipe side of the switch valve matches the pressure in the intake pipe. For example, in the case where the intake pipe has the negative pressure by driving of the combustion engine, the gas pipe also has a negative pressure. On the other hand, when the gas pipe detaches from the check valve, the gas pipe is communicated directly to open air. As a result, the pressure on the intake pipe side of the switch valve approximates ambient pressure. Due to this, the variation in the pressure in the gas pipe on the gas generation source side of the switch valve upon when the communication state and the non-communication state switch consecutively differs by the pressure on the intake pipe side of the switch valve, that is, whether or not the gas pipe is detached from the check valve. Thus, the determination on the gas pipe being detached from the check valve may be made by using the pressure variation between the gas generation source and the switch valve.

The determining unit may comprise a pressure sensor disposed on the gas pipe between the gas generation source and the switch valve. According to this configuration, the pressure variation may directly be detected by the pressure sensor.

The vehicle gas processing device may further comprise an electric pump disposed on the gas pipe. The determining unit may be configured to determine the pressure variation in the gas pipe between the gas generation source and the switch valve by detecting at least one of a variation in a rotation speed of the electric pump and a variation in the electric power supplied to the electric pump when the communication state and the non-communication state are switched consecutively by the switch valve under a condition where the electric pump is boosting the gas between the gas generation source and the switch valve in the non-communication state. According to this configuration, a sensor and the like for detecting the pressure in the gas pipe may not be provided.

DETAILED DESCRIPTION

First Embodiment

Figure 1:
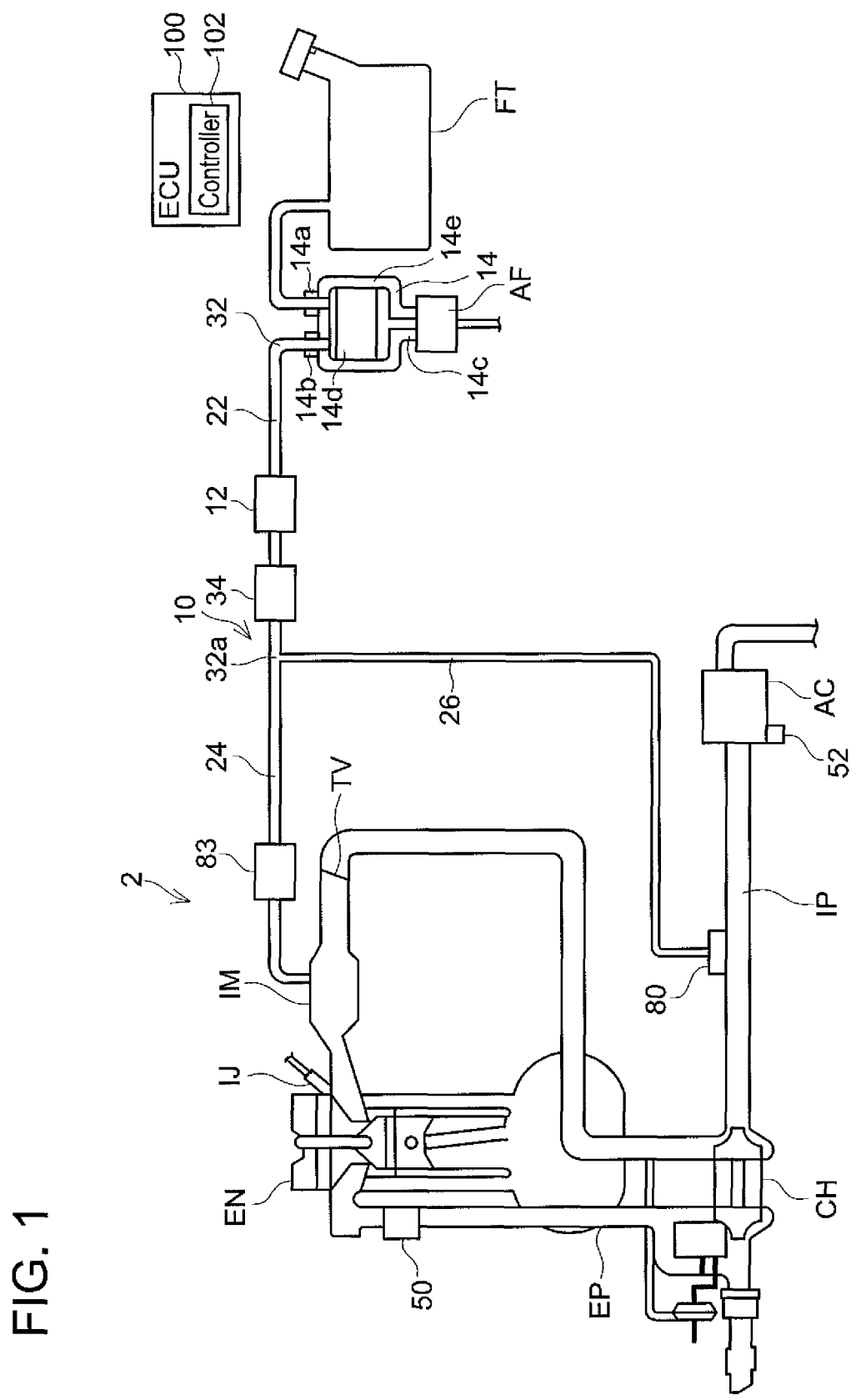
FIG. 1 shows a schematic overview of a fuel supply system of a vehicle of a first embodiment.

An evaporated fuel processing device 10 will be described with reference to the drawings. As shown in FIG. 1, the evaporated fuel processing device 10 is mounted on a vehicle such as an automobile, and is arranged in a fuel supply system 2 that supplies fuel stored in a fuel tank FT to an engine EN.

The fuel supply system 2 supplies fuel pumped from a fuel pump (not shown) housed in the fuel tank FT to an injector IJ. The injector IJ includes an solenoid valve of which aperture is adjusted by an ECU (abbreviation of Engine Control Unit) 100 to be described later. The injector IJ injects the fuel to an engine EN.

The engine EN is connected to an intake pipe IP and an exhaust pipe EP respectively. The intake pipe IP is a pipe for supplying air to the engine EN by a negative pressure of the engine EN or by operation of a supercharger CH. A throttle valve TV is arranged on the intake pipe IP. The throttle valve TV controls an air amount that flows into the engine EN by adjusting the aperture of the intake pipe IP. The throttle valve TV is controlled by the ECU 100. The supercharger CH is arranged on an upstream side of the throttle valve TV on the intake pipe IP. The supercharger CH is a so-called turbo charger which rotates a turbine by gas discharged from the engine EN to the exhaust pipe EP, by which the air in the intake pipe IP is compressed and supplied to the engine EN. The supercharger CH is controlled by the ECU 100 such that it is activated when a rotation speed N of the engine EN exceeds a preset rotation speed (for example, 2000 rpm).

An air cleaner AC is arranged on the upstream side of the supercharger CH on the intake pipe IP. The air cleaner AC includes a filter for removing foreign particles from the air flowing into the intake pipe IP. In the intake pipe IP, when the throttle valve TV opens, the air is suctioned toward the engine EN through the air cleaner AC. The engine EN performs combustion therein using the fuel and the air, and discharges gas after the combustion to the exhaust pipe EP.

In a situation where the supercharger CH is stopped, a negative pressure is generated in the intake pipe IP by operation of the engine EN. In a case where idling of the engine EN is stopped during a vehicle stop or in a case of running on a motor by stopping the engine EN such as in a hybrid car, that is, in a case of controlling the engine EN to be driven in an eco-friendly manner, a situation in which the negative pressure in the intake pipe IP by driving the engine EN is not generated or is small may occur. On the other hand, in a situation where the supercharger CH is operating, the upstream side of the supercharger CH is in an air pressure, whereas a positive pressure is generated in a downstream side of the supercharger CH.

The evaporated fuel processing device 10 supplies vapor fuel in the fuel tank FT to the engine EN through the intake pipe IP. The evaporated fuel processing device 10 includes a canister 14, a pump 12, a gas pipe 32, a purge control valve 34, a controller 102 in the ECU 100, and check valves 80, 83. The canister 14 adsorbs the vapor fuel generated in the fuel tank FT. The canister 14 includes an activated charcoal 14d and a casing 14e that houses the activated charcoal 14d. The casing 14e includes a tank port 14a, a purge port 14b, and an air port 14c. The tank port 14a is connected to an upper end of the fuel tank FT. Due to this, the vapor fuel in the fuel tank FT flows into the canister 14. The activated charcoal 14d adsorbs the vapor fuel from gas flowing into the casing 14e from the fuel tank FT. Due to this, the vapor fuel can be prevented from being released into open air.

The air port 14c communicates with open air via the air filter AF. The air filter AF removes foreign particles from air flowing into the canister 14 through the air port 14c.

A gas pipe 32 communicates with the purge port 14b. The gas pipe 32 branches at a branching point 32a at an intermediate position thereof, and one side is connected to the intake pipe IP on the upstream side of the supercharger CH and the other side is connected to the intake pipe IP between the throttle valve TV and the engine EN on the downstream side of the supercharger CH. The gas pipe 32 is configured of first to third hoses 24, 26, 22. The first to third hoses 24, 26, 22 are constituted of a flexible material such as rubber or resin.

The gas including the vapor fuel in the canister 14 (which is hereinbelow termed "purge gas") flows into the third hose 22 from the canister 14 through the purge port 14b. The purge gas in the third hose 22 flows through the branching point 32a, and flows into the first hose 24 or the second hose 26. The purge gas that flows into the first hose 24 is supplied to the intake pipe IP between the throttle valve TV and the engine EN (more specifically, an intake manifold IM of the engine EN). On the other hand, the purge gas that flows into the second hose 26 is supplied to the intake pipe IP on the upstream side of the supercharger CH.

The pump 12 is arranged at an intermediate position of the third hose 22. That is, the pump 12 is arranged between the canister 14 and the intake pipe IP. The pump 12 is a so-called vortex pump (which may also be called a cascade pump or a Wesco pump). The pump 12 is controlled by the controller 102. A suction inlet of the pump 12 communicates with the canister 14 via the third hose 22.

A discharge outlet 12b of the pump 12 communicates with the branching point 32a of the gas pipe 32 via the third hose 22. The gas pipe 32 branches into the first hose 24 and the second hose 26 on a downstream side of the branching point 32a. The second hose 26 is connected to the intake pipe IP on the upstream side of the supercharger CH via the check valve 80. The check valve 80 allows the gas to be supplied from the second hose 26 to the intake pipe IP while prohibits the gas to be supplied from the intake pipe IP to the second hose 26.

Figure 2:
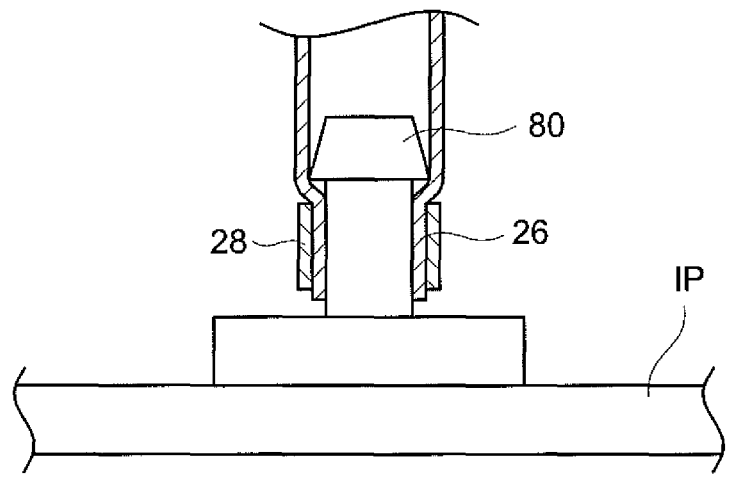
FIG. 2 is a schematic vertical cross-sectional view showing a configuration of a connecting portion of a hose and an intake pipe.
Figure 3:
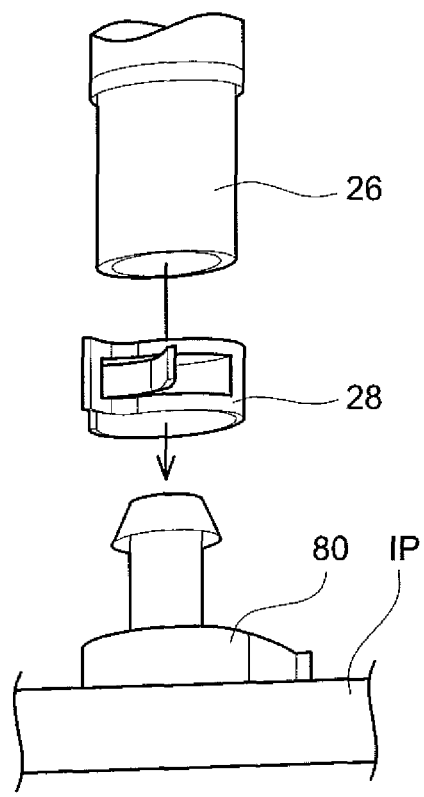
FIG. 3 is an exploded perspective view showing the configuration of the connecting portion of the hose and the intake pipe.

A configuration of a connecting portion of the second hose 26 and the intake pipe IP will be described with reference to FIGS. 2 and 3. The check valve 80 is fabricated integrally with the intake pipe IP on an outer circumferential side of the intake pipe IP. The check valve 80 includes a through hole that communicates into the intake pipe IP, and extends to an upper end of FIG. 2. The through hole has a valve body arranged therein. The second hose 26 is arranged on an outside of the check valve 80. As shown in FIG. 3, the check valve 80 is inserted into the second hose 26. At this occasion, the second hose 26 is elastically deformed to insert the check valve 80. Then, the second hose 26 is tightened from outside of the second hose 26 by an annular clip 28 to be attached to the check valve 80.

The first hose 24 is detachably attached to the intake manifold IM. The check valve 83 is arranged at an intermediate position of the first hose 24. The check valve 83 allows the gas to flow in the first hose 24 toward an intake manifold IM side and prohibits it to flow toward a canister 14 side. In this configuration, the hoses 24, 26 can be detached from the intake pipe IP upon working for vehicle maintenance and inspection. Further, the hoses 24, 26 can easily be replaced.

On the other hand, after the second hose 26 has been detached from the intake pipe IP, there may be a case where the second hose 26 detaches from the intake pipe IP due to having forgotten to attach, or the second hose 26 detaches from the intake pipe IP while running due to the attachment not having been performed properly. As will be described later, the evaporated fuel processing device 10 detects the detachment of the second hose 26.

The purge control valve 34 is arranged on the third hose 22. In a case where the purge control valve 34 is in a closed state, the purge gas in the third hose 22 is stopped by the purge control valve 34, and does not flow toward the hoses 24, 26. On the other hand, when the purge control valve 34 is opened, the purge gas flows into the intake pipe IP or the intake manifold IM. The purge control valve 34 is an electronic control valve, and is controlled by the controller 102.

The controller 102 is a part of the ECU 100, and is arranged integrally with other parts of the ECU 100 (such as a part that controls the engine EN). The controller 102 may be arranged separately from the other parts of the ECU 100. The controller 102 includes a CPU and a memory such as ROM and RAM. The controller 102 controls the evaporated fuel processing device 10 according to a program that is stored in the memory in advance. Specifically, the controller 102 outputs a signal to the pump 12 to control the pump 12. Further, the controller 102 outputs a signal to the purge control valve 34 to perform duty control. That is, the controller 102 adjusts an opening time period for the purge control valve 34 by adjusting a duty ratio of the signal outputted to the purge control valve 34.

The ECU 100 is connected to an air-fuel ratio sensor 50 arranged in the exhaust pipe EP. The ECU 100 detects an air-fuel ratio in the exhaust pipe EP from a detection result of the air-fuel ratio sensor 50 to control a fuel injection amount from the injector U.

Further, the ECU 100 is connected to an air flowmeter 52 arranged in a vicinity of the air cleaner AC. The air flowmeter 52 is a so-called hot-wire air flowmeter, however, it may have another configuration. The ECU 100 receives a signal indicating a detection result from the air flowmeter 52 to detect a gas amount suctioned into the engine EN.

Next, a purge process to supply the purge gas flowing out from the canister 14 to the intake pipe IP will be described. During when the engine EN is driving, there is a case where the purge gas is supplied from the canister 14 to the engine EN. Upon when the purge gas is supplied to the engine EN, whether it passes through the first hose 24 or through the second hose 26 depends on whether or not the supercharger CH is operating. Specifically, when the controller 102 opens the purge control valve 34 in a situation where the supercharger CH is not operating, the purge gas passes through the third hose 22 and the first hose 24 from the canister 14 and is supplied to the intake manifold IM on the downstream side of the supercharger CH. At this occasion, the controller 102 performs control to drive or stop the pump 12 according to a state of a negative pressure in the intake manifold IM (such as rotation speed of the engine EN).

In a case of shifting from the situation where the supercharger CH is not operating to a situation where the supercharger CH is operating, the purge gas passes through the third hose 22 and the second hose 26 from the canister 14 and is supplied to the intake pipe IP on the upstream side of the supercharger CH. At this occasion, sine the purge gas is fed to the intake pipe IP in an ambient pressure state, the controller 102 drives the pump 12 to send out the purge gas. Due to this, in the situation where the supercharger CH is operating, the purge gas does not have to be supplied to the intake manifold IM on the downstream side of the supercharger CH being in the positive pressure.

On the other hand, in a case of shifting from the situation where the supercharger CH is operating to the situation where the supercharger CH is not operating, the purge gas passes through the third hose 22 and the first hose 24 from the canister 14 and is supplied to the intake manifold IM.

Figure 4:
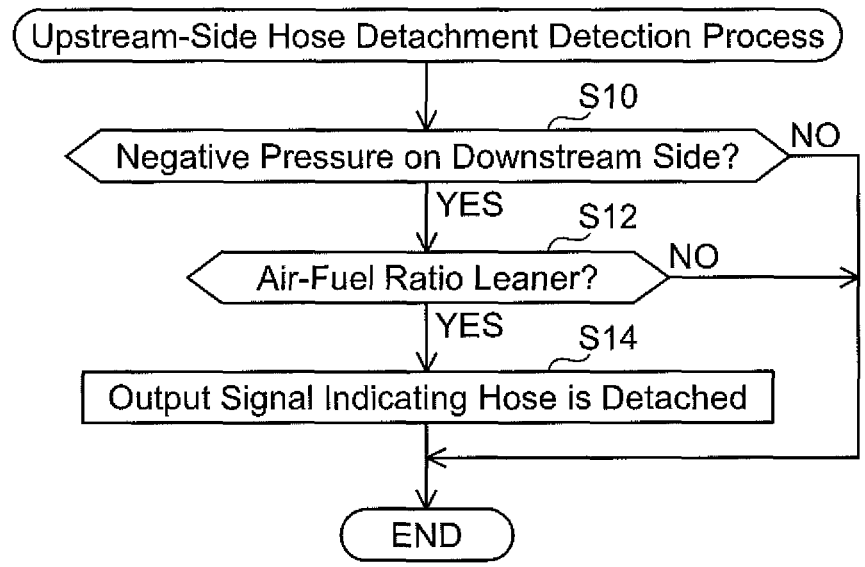
FIG. 4 shows a flowchart of an upstream-side hose detachment detection process of the first embodiment.

Next, an upstream-side hose detachment detection process for detecting the detachment of the second hose 26 performed by the controller 102 will be described with reference to FIG. 4. The "upstream side" herein means being on the upstream side of the supercharger CH. When the vehicle is driven, the controller 102 performs this process. In S10, the controller 102 determines whether the pressure in the intake pipe IP on the downstream side of the supercharger CH is in the negative pressure or not. Specifically, the controller 102 determines that the intake pipe IP on the downstream side of the supercharger CH is in the negative pressure in a case where the engine EN is driving and the supercharger CH is not operating (YES in S10), and determines that the intake pipe IP on the downstream side of the supercharger CH is not in the negative pressure in a case where the engine EN is not driving (for example, the case of running on the motor in the hybrid car) or in a case where the supercharger CH is operating (NO in S10).

In the case of NO in S10, this process is terminated. On the other hand, in the case of YES in S10, the controller 102 determines whether the detection result of the air-fuel ratio sensor 50 is leaner than a preset reference ratio or not in S12. When the second hose 26 is detached from the intake pipe IP in the case where the intake pipe IP on the downstream side of the supercharger CH is in the negative pressure, an end of the second hose 26 is open to the air and the air flows in toward the intake pipe IP. Due to this, the detection result of the air-fuel ratio sensor 50 becomes leaner than the preset reference ratio. This reference ratio is set to a degree that would not take place in a situation where the vehicle is running normally. This reference ratio is identified in advance by experiments, and is stored in the controller 102.

To specifically describe the process of S12, the ECU 100 uses the detection result of the air-fuel ratio sensor 50 to feedback on an injection time period of the injector U to adjust the injection time period. For example, in a case where the detection result of the air-fuel ratio sensor 50 is lean, the injection time period is made longer by increasing a feedback value. On the other hand, in a case where the detection result of the air-fuel ratio sensor 50 is rich, the injection time period is made shorter by decreasing the feedback value. That is, the injection time period of the injector U becomes longer for a greater feedback value. A case where the feedback value is equal to or greater than a predetermined value is a state in which the lean state of the air-fuel ratio in the air-fuel ratio sensor 50 is not resolved despite elongating the injection time period of the injector U. The predetermined value is identified in advance by experiments, and is stored in the controller 102. The controller 102 determines whether the calculated feedback value is equal to or greater than the predetermined value or not. In a case where the feedback value is less than the predetermined value, a determination is made that the air-fuel ratio is not leaner than the preset reference ratio (NO in S12), and this process is terminated. In the case of NO in S12, the second hose 26 can be determined as not being detached from the intake pipe IP.

In a case where the feedback value is equal to or greater than the predetermined value, the controller 102 determines that the air-fuel ratio is leaner than the preset reference ratio (YES in S12), and in S14, the controller 102 outputs a signal indicating a possibility that the second hose 26 is detached from the intake pipe IP to an indicator of the vehicle. When the signal is inputted, the indicator of the vehicle outputs a display indicating the possibility that the second hose 26 is detached from the intake pipe IP. Due to this, the driver can acknowledge the possibility that the second hose 26 is detached from the intake pipe IP. Aside from the case where the second hose 26 is detached from the intake pipe IP, cases where the air-fuel ratio is leaner than the preset reference ratio in the case where the feedback value is equal to or greater than the predetermined value include a case where the injector U is not supplying the fuel normally, a case where the throttle valve is not opening and closing normally, and a case where the air flowmeter 52 is not detecting normally.

When the first hose 24 detaches from the intake manifold IM, the intake manifold IM communicates with open air. As a result, in the situation where the supercharger CH is not operating, the air flows into the intake manifold IM and the air-fuel ratio drastically and dynamically shifts to a leaner side. On the other hand, in the situation where the supercharger CH is operating, the air from the supercharger CH is discharged to outside from the intake manifold IM, and the air-fuel ratio drastically and dynamically shifts to a richer side. The controller 102 determines that the first hose 24 is detached in the case where the air-fuel ratio exhibits a drastic change. At this occasion, the controller 102 outputs a signal indicating a possibility that the first hose 24 is detached from the intake manifold IM to the indicator of the vehicle.

Second Embodiment

Figure 5:
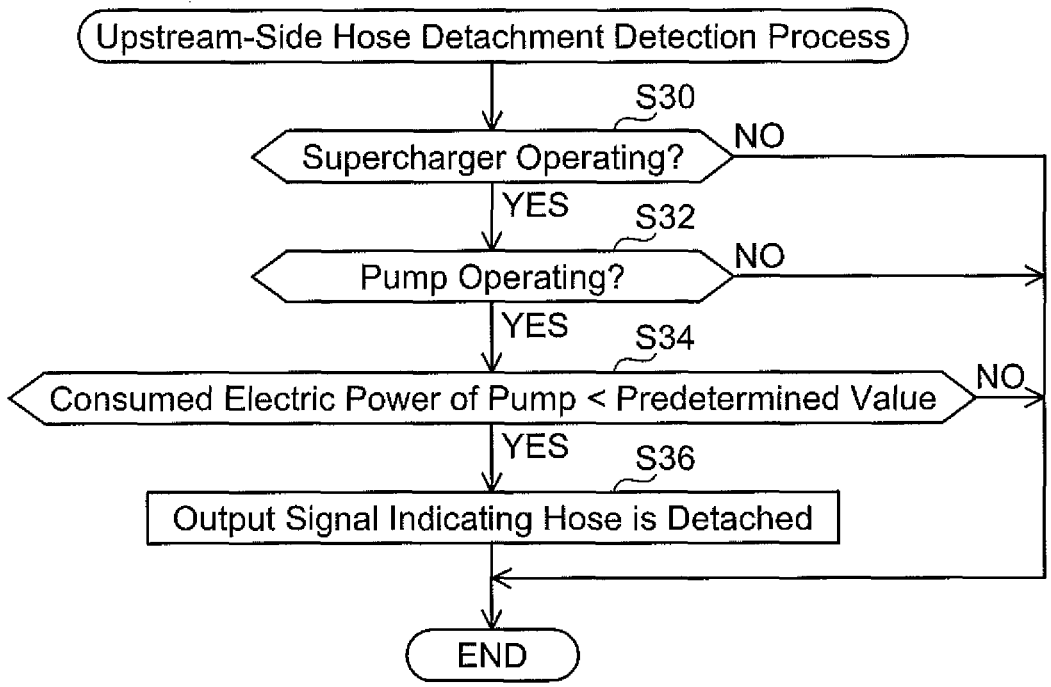
FIG. 5 shows a flowchart of an upstream-side hose detachment detection process of a second embodiment.

Points in a second embodiment that are different from those in the first embodiment will be described. In the second embodiment, contents of the upstream-side hose detachment detection process that the controller 102 performs are different. As shown in FIG. 5, in the present process, firstly the controller 102 determines whether the supercharger CH is operating or not in S30. In a case where the supercharger CH is operating, the intake manifold IM on the downstream side is in a positive pressure. The present process determines that the supercharger CH is operating (YES in S30) and the process continues. In a case where the supercharger CH is not operating (NO in S30), the present process is terminated. In the case where the supercharger CH is operating, the purge gas flows to the intake pipe IP through the second hose 26.

In the case of YES in S30, the controller 102 determines whether or not the pump 12 is operating in S32. In a case where the intake manifold IM on the downstream side of the supercharger CH is in the positive pressure, the pump 12 has to be operated to perform a purge process. In a case where the pump 12 is not operating (NO in S32), the present process is terminated. At this occasion, the purge process is not performed, and the detachment of the second hose 26 is not detected.

In the case where the pump 12 is operating (YES in S32), the controller 102 determines whether or not consumed electric power of the pump 12 is less than a predetermined value in S34. Specifically, the controller 102 stores in advance a data map indicating a relationship between rotation speed and the consumed electric power of the pump 12. This data map is created in advance based on experiments, and is stored in the controller 102. In the case where the second hose 26 is detached from the intake pipe IP, the pump 12 is not affected by a pressure loss by the check valve 80, so the consumed electric power of the pump 12 is small as compared to a case where the second hose 26 is connected to the intake pipe IP. The controller 102 uses the data map indicating the relationship between the rotation speed and the consumed electric power, and terminates the present process in a case where the consumed electric power relative to the rotation speed in the of the pump 12 at present is equal to or greater than the consumed electric power relative to the rotation speed (that is, the predetermined value) (NO in S34).

On the other hand, in a case where the consumed electric power relative to the rotation speed in the of the pump 12 at present is less than the consumed electric power relative to the rotation speed (that is, the predetermined value) (YES to S34), the controller 102 outputs a signal indicating that the second hose 26 is detached from the intake pipe IP to the indicator of the vehicle in S36. When the signal is inputted, the indicator of the vehicle outputs a display indicating that the second hose 26 is detached from the intake pipe IP. Due to this, the driver can acknowledge that the second hose 26 is detached from the intake pipe IP.

Third Embodiment

Figure 6:
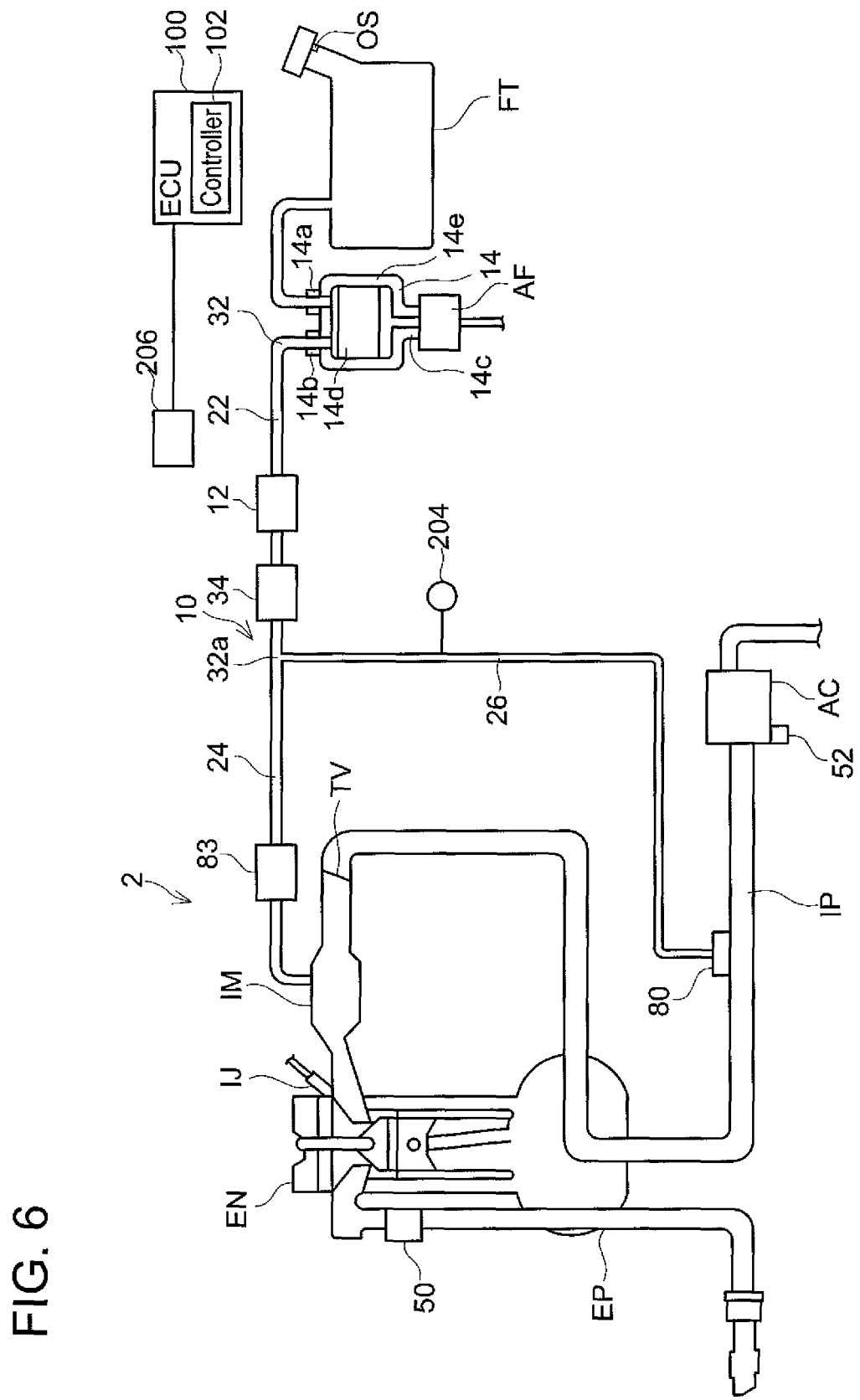
FIG. 6 shows a schematic overview of a fuel supply system of a vehicle of a third embodiment.

Points in a third embodiment that are different from those in the first embodiment will be described. As shown in FIG. 6, the evaporated fuel processing device 10 further includes a pressure sensor 204 that measures a pressure of the purge gas in the second hose 26 and a pressure sensor 206 that measures the air pressure.

The controller 102 stores in advance a data map indicating a relative relationship between an estimated purge gas flow rate in the second hose 26 and a pressure difference of the pressure in the second hose 26 and the air pressure. This data map is identified in advance by experiments, and is stored in the controller 102.

Figure 7:
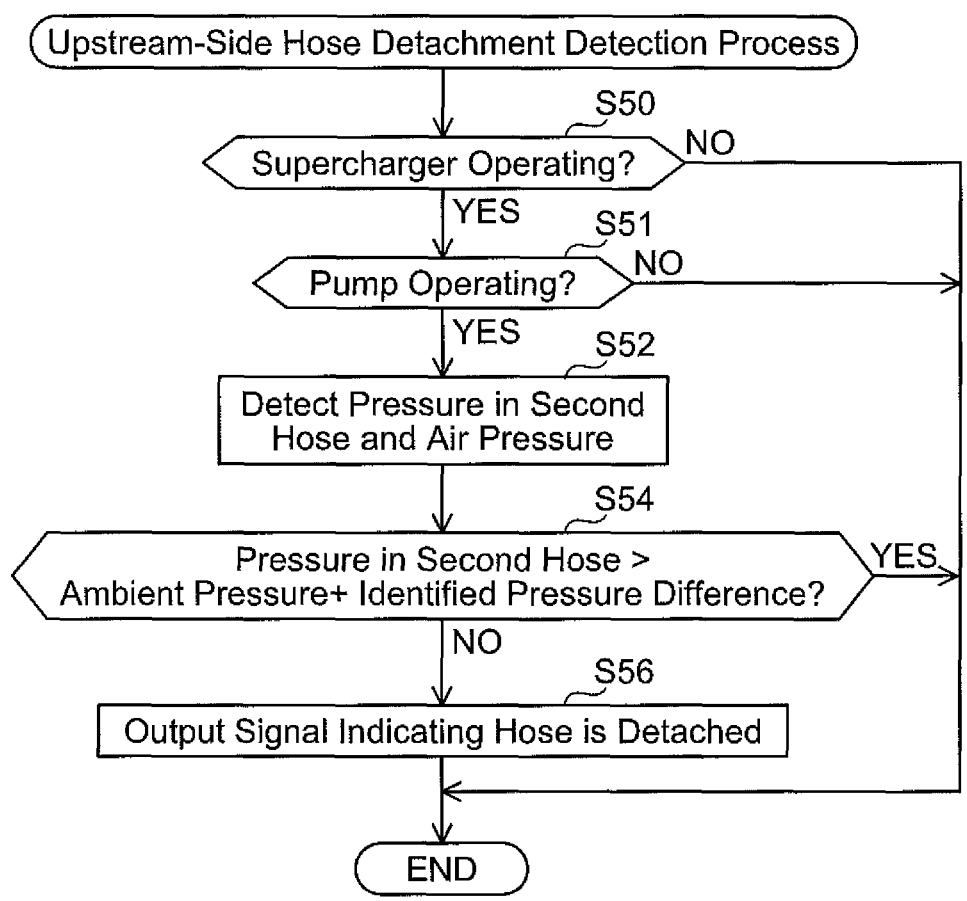
FIG. 7 shows a flowchart of an upstream-side hose detachment detection process of the third embodiment.

In the present embodiment, the determination on whether the second hose 26 is detached or not is made by the upstream-side hose detachment detection process shown in FIG. 7. In a case where the purge gas is supplied from the second hose 26 to the intake pipe IP through the check valve 80, the pressure of the purge gas becomes high on an upstream side of the check valve 80 by the pressure loss in the check valve 80. On the other hand, in a case where the second hose 26 is detached from the check valve 80, since the purge gas is discharged from the second hose 26 without flowing through the check valve 80, the pressure of the purge gas does not become high. In the upstream-side hose detachment detection process of the present embodiment, the determination on whether or not the second hose 26 is detached is made by using the change in the pressure of the purge gas in the second hose 26 between the case where the second hose 26 is attached to the check valve 80 and the case of being detached therefrom.

As shown in FIG. 7, in the upstream-side hose detachment detection process, firstly, S50 and S51 which are same as the processes of S30 and S32 of the second embodiment are performed, and in a case of YES in both S50 and S51 (that is, in the case of determining that the purge gas is flowing in the second hose 26), the controller 102 uses the pressure sensor 204 to detect the pressure in the second hose 26 in S52. Further, the controller 102 uses the pressure sensor 206 to detect the ambient pressure. Next, in S54, the controller 102 uses the data map to identify the pressure difference corresponding to the flow rate of the purge gas in the second hose 26. Then, the controller 102 determines whether or not the pressure in the second hose 26 as detected in S52 is equal to or greater than a value that is obtained by adding the ambient pressure detected in S52 and the identified pressure difference. In a case where the pressure in the second hose 26 is equal to or greater than the obtained value (YES in S54), the present process is terminated. On the other hand, in a case where the pressure in the second hose 26 is less than the added value (NO in S54), the controller 102 outputs the signal indicating that the second hose 26 is detached from the intake pipe IP to the indicator of the vehicle in S56.

On the other hand, in a case of NO in S50 or S51 (that is, in the case of determining that the purge gas is not flowing in the second hose 26), the present process is terminated.

Figure 8:
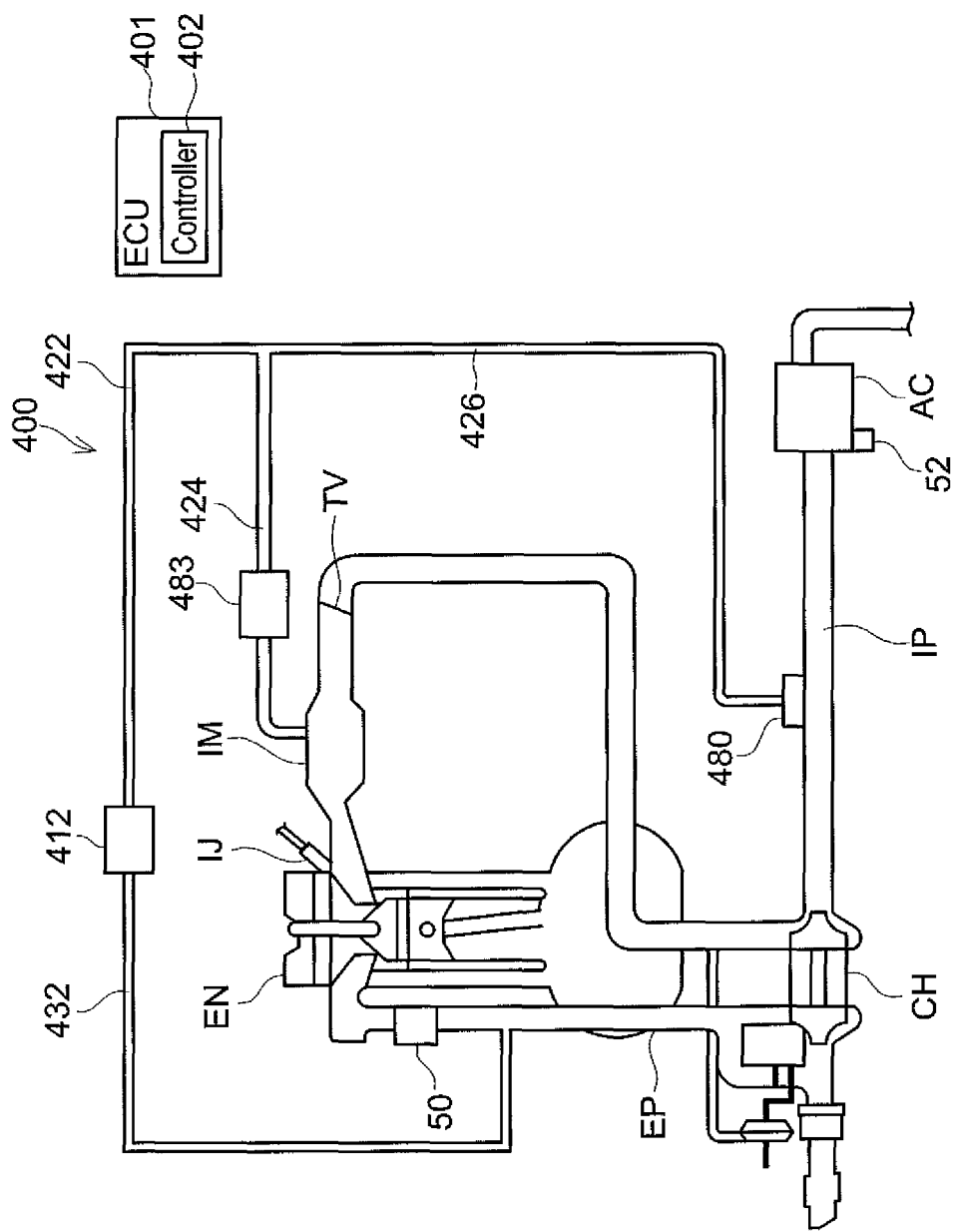
FIG. 8 shows a schematic overview of an exhaust gas recirculation system of a vehicle of a fourth embodiment.
Figure 9:
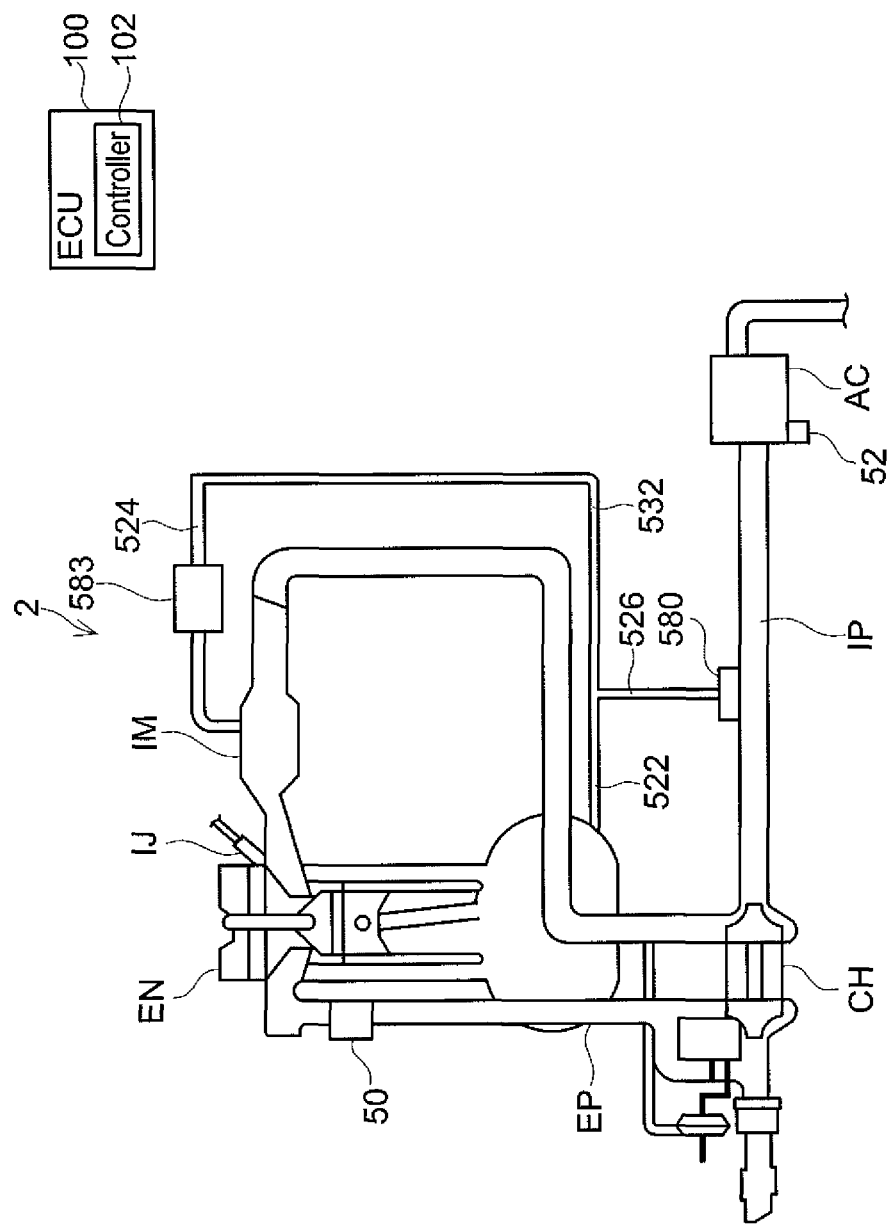
FIG. 9 shows a schematic overview of a blowby gas processing system of a vehicle of a fifth embodiment.

In the first to third embodiments, the evaporated fuel processing device 10 that supplies the purge gas to the intake pipe IP is described. However, the technique disclosed herein can be used in an exhaust gas recirculation system 400 which circulates a part of the exhaust gas from the engine EN to the intake pipe IP from the exhaust pipe EP as shown in FIG. 8. Further, as shown in FIG. 9, it may be used in a blowby gas processing system 500 as well.

Fourth Embodiment

As shown in FIG. 8, the exhaust gas recirculation system 400 includes an EGR pump 412, a gas pipe 432, a controller 402 in an ECU 401, and check valves 480, 483. The gas pipe 432 communicates with the exhaust pipe EP and the intake pipe IP. The gas pipe 432 is configured of first to third hoses 424, 426, 422 that are similar to the first to third hoses 24, 26, 22. The first hose 424 is connected to the intake manifold IM. The check valve 483 is arranged at an intermediate position of the first hose 424. On the other hand, the second hose 426 is connected to the intake pipe IP on the upstream side than the throttle valve TV via the check valve 480.

The EGR pump 412 is arranged at an intermediate position of the third hose 422. The EGR pump 412 is a so-called vortex pump, and is controlled by the controller 402. The controller 402 performs at least one of the upstream-side hose detachment detection processes of the first to third embodiments.

Fifth Embodiment

As shown in FIG. 9, the blowby gas processing system 500 introduces blowby gas generated in the engine EN into the intake pipe IP and combust it in the engine EN. The blowby gas processing system 500, includes a gas pipe 532, a controller 502 in an ECU 501, and check valves 580, 583. The gas pipe 532 communicates with the engine EN and the intake pipe IP. The gas pipe 532 is configured of first to third hoses 524, 526, 522 that are similar to the first to third hoses 24, 26, 22. The first hose 524 is connected to the intake manifold IM. The check valve 583 is arranged at an intermediate position of the first hose 524. On the other hand, the second hose 526 is connected to the intake pipe IP on the upstream side than the throttle valve TV via the check valve 580. The controller 502 performs at least one of the upstream-side hose detachment detection process of the first embodiment and the hose detachment detection process of the third embodiment. A pump may be arranged on the third hose 522. At this occasion, the controller 502 may be performed at least one of the upstream-side hose detachment detection processes of the first to third embodiments.

Sixth Embodiment

An evaporated fuel processing device 600 of a sixth embodiment will be described with reference to the drawing. The configurations that are in common with those in the first embodiment may be omitted of its description.

Figure 13:
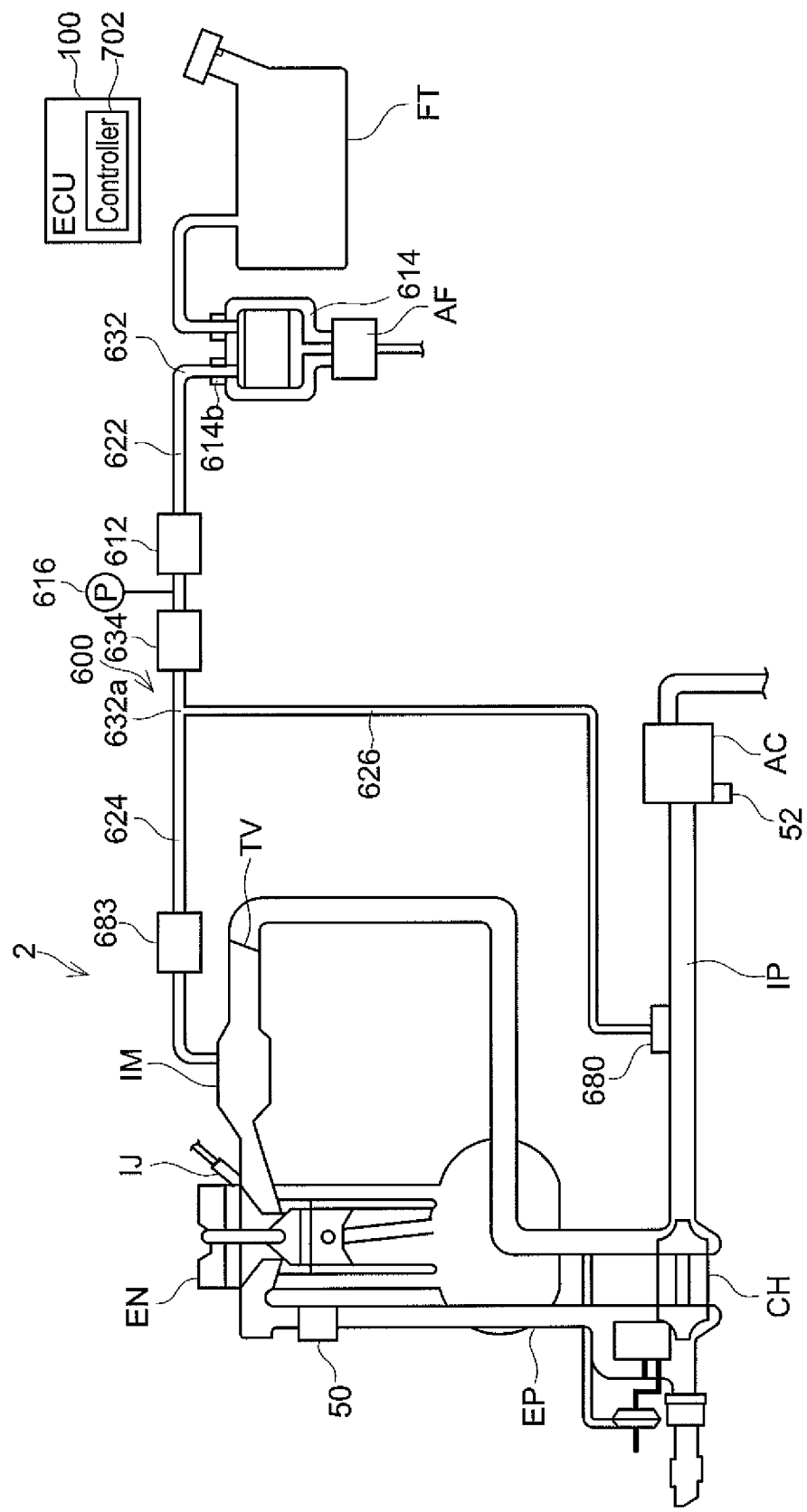
FIG. 13 shows a schematic overview of a fuel supply system of a vehicle of a sixth embodiment.

As shown in FIG. 13, the evaporated fuel processing device 600 is arranged in the fuel supply system 2 similar to the evaporated fuel processing device 10.

The evaporated fuel processing device 600 supplies the vapor fuel in the fuel tank FT to the engine EN through the intake pipe IP. The evaporated fuel processing device 600 is provided with a canister 614, a pump 612, a gas pipe 632, a purge control valve 634 (which is an example of a "switch valve"), a pressure sensor 616, a controller 702 in an ECU 100, and check valves 680, 683. The canister 614 has a same configuration as the canister 14.

The gas pipe 632 communicate with a purge port 614b of the canister 614. The gas pipe 632 branches at a branching point 632a at an intermediate position thereof; and one side is connected to the intake pipe IP on the upstream side of the supercharger CH and the other side is connected to the intake pipe IP between the throttle valve TV and the engine EN on the downstream side of the supercharger CH, specifically to the intake manifold IM. The gas pipe 632 is configured of first, second, and third hoses 624, 626, 622. The first, second, and third hoses 624, 626, 622 are respectively similar to the first, second, and third hoses 24, 26, 22.

That is, the purge gas flows from the canister 614 into the third hose 622 through the purge port 614b. The purge gas in the third hose 622 flows into the first hose 624 or the second hose 626 via the branching point 632a. The purge gas that flows into the first hose 624 is supplied to the intake pipe IP between the throttle valve TV and the engine EN (more specifically, the intake manifold IM of the engine EN). On the other hand, the purge gas that flows into the second hose 626 is supplied to the intake pipe IP on the upstream side of the supercharger CH.

The pump 612 is arranged at an intermediate position of the third hose 622. That is, the pump 612 is arranged between the canister 614 and the intake pipe IP. The pump 612 is similar to the pump 12. The pump 612 is controlled by the controller 702. A suction inlet of the pump 612 communicates with the canister 614 via the third hose 622.

A discharge outlet of the pump 612 communicates with the branching point 632a of the gas pipe 632 via the third hose 622. The gas pipe 632 branches into the first hose 624 and the second hose 626 at a downstream side of the branching point 632a. The second hose 626 is connected to the intake pipe IP on the upstream side of the supercharger CH via the check valve 680. The check valve 680 is similar to the check valve 80.

A configuration of a connecting portion of the second hose 626 and the intake pipe IP is similar to the configuration of the connecting portion of the second hose 26 and the intake pipe IP.

The first hose 624 is detachably attached to the intake manifold IM. The check valve 683 is arranged at an intermediate position of the first hose 624. The check valve 683 is similar to the check valve 83.

The purge control valve 634 is arranged on the third hose 622. In a case where the purge control valve 634 is in a closed state, the purge gas in the third hose 622 is stopped by the purge control valve 634, and does not flow toward the hoses 624, 626. At this occasion, the canister 614 and the intake pipe IP or the intake manifold IM are not communicated, and come to be in a non-communication state. On the other hand, when the purge control valve 634 is opened, the purge gas flows into the intake pipe IP or the intake manifold IM. At this occasion, the canister 614 and the intake pipe IP or the intake manifold IM come into a communication state in which they are communicated. The purge control valve 634 is an electronic control valve, and is controlled by the controller 702.

The pressure sensor 616 is arranged on the third hose 622 between the purge control valve 634 and the pump 612. The pressure sensor 616 detects a pressure in the third hose 622 on the upstream side of the purge control valve 634.

The controller 702 is a part of the ECU 100, and is arranged integrally with other parts of the ECU 100 (such as the part that controls the engine EN). The controller 702 may be arranged separately from the other parts of the ECU 100. The controller 702 includes a CPU and a memory such as ROM and RAM. The controller 702 controls the evaporated fuel processing device 600 according to the program that is stored in the memory in advance. Specifically, the controller 702 outputs a signal to the pump 612 to control the pump 612. Further, the controller 702 outputs a signal to the purge control valve 634 to perform duty control, similar to the controller 102 performing the duty control of the purge control valve 34.

The evaporated fuel processing device 600 performs a similar purge process as the evaporated fuel processing device 10. As a result, in the situation where the supercharger CH is not operating, the purge gas passes through the third hose 622 and the first hose 624 from the canister 614 and is supplied to the intake manifold IM on the downstream side of the supercharger CH. On the other hand, in the situation where the supercharger CH is operating, the purge gas passes through the third hose 622 and the second hose 626 from the canister 614 and is supplied to the intake pipe IP on the upstream side of the supercharger CH.

Figure 14:
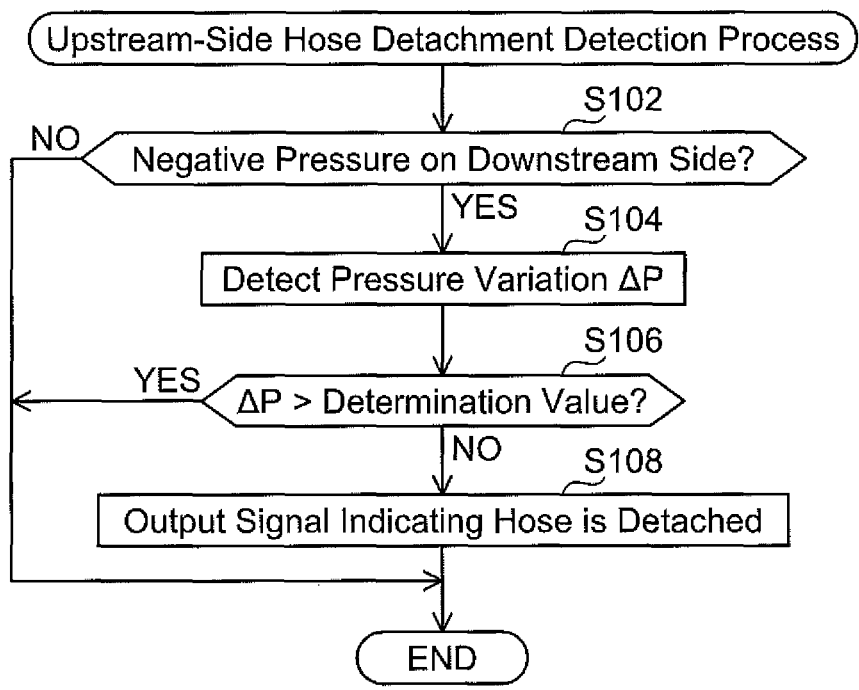
FIG. 14 shows a flowchart of an upstream-side hose detachment detection process of the sixth embodiment.

Next, an upstream-side hose detachment detection process for detecting detachment of the second hose 626 performed by the controller 702 will be described with reference to FIG. 14. The "upstream side" herein means being on the upstream side of the supercharger CH. When the vehicle is driven, the controller 702 performs this process. In S102, the controller 702 determines whether the intake pipe IP on the downstream side of the supercharger CH is in the negative pressure or not. Specifically, the controller 702 determines that the intake pipe IP on the downstream side of the supercharger CH is in the negative pressure in the case where the engine EN is driving and the supercharger CH is not operating (YES in S102), and determines that the intake pipe IP on the downstream side of the supercharger CH is not in the negative pressure in the case where the engine EN is not driving (for example, the case of running on the motor in the hybrid car) or in the case where the supercharger CH is operating (NO in S102).

Figure 15:
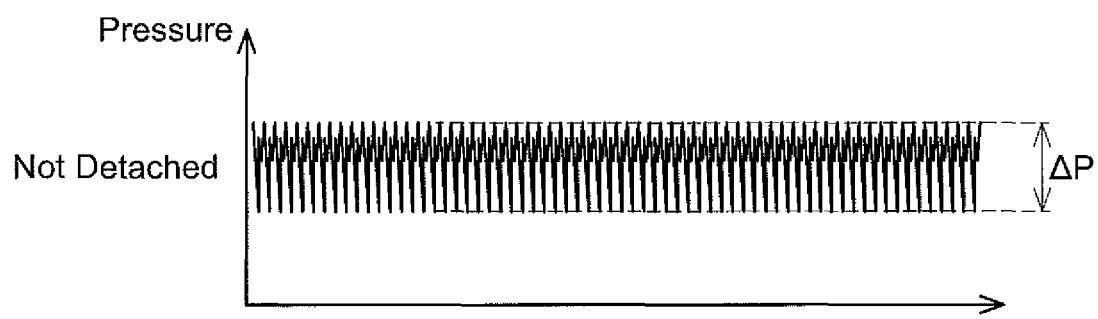
FIG. 15 shows a pressure variation of a third hose in a case where a second hose is not detached in the sixth embodiment.

In the case of NO in S102, this process is terminated. On the other hand, in the case of YES in S102, the purge gas is being supplied to the intake manifold IM through the first hose 624. At this occasion, in the case where the pressure in the intake pipe IP on the downstream side of the supercharger CH is the negative pressure and the second hose 626 is not detached from the intake pipe IP, when the purge control valve 634 is in the closed state (that is, the intake pipe IP and the canister 614 being in the non-communication state), the intake pipe IP side of the purge control valve 634 is in the negative pressure while the third hose 622 on a canister 614 side of the purge control valve 634 is in a pressure equal to or greater than the air pressure. More specifically, the third hose 622 on the canister 614 side of the purge control valve 634 is in the positive pressure in a case where the pump 612 is driving, and is in the pressure substantially equal to the air pressure in a case where the pump 612 is not driven. Due to this, a pressure difference is generated between upstream and downstream of the purge control valve 634. Thus, in a case where the controller 702 performs the duty control of the purge control valve 634 and the switch between the communication state and the non-communication state is repeated, the pressure on the upstream side of the control valve 634 repeatedly varies between the negative pressure and the air pressure or the positive pressure as shown in FIG. 15.

Figure 16:
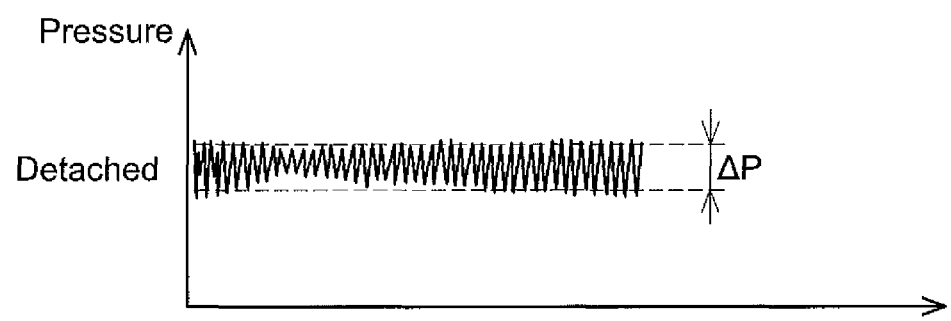
FIG. 16 shows the pressure variation of the third hose in a case where the second hose is detached in the sixth embodiment.

However, in a case where the second hose 626 is nonetheless detached from the intake pipe IP despite the pressure in the intake pipe IP on the downstream side of the supercharger CH being the negative pressure, the pressure on the downstream side of the purge control valve 634 is substantially equal to the air pressure. As a result, as shown in FIG. 16, the variation in the pressure of the upstream side of the purge control valve 634 is small even if the purge control valve 634 is subjected to the duty control.

In the case of YES in S102, the controller 702 uses the pressure sensor 616 in S104 to detect a pressure variation ΔP for a period during which the purge control valve 634 is subjected to the duty control. Specifically, as shown in FIGS. 15 and 16, the controller 702 calculates a difference between an average of pressures on a high-pressure side (that is, the pressures for the case of being in the non-communication state by the purge control valve 634) and an average of pressures on a low-pressure side (that is, the pressures for the case of being in the communication state by the purge control valve 634) among the pressures detected over plural times by the pressure sensor 616.

Next, in S106, the controller 702 determines whether the pressure variation ΔP is greater than a preset determination value. The determination value is identified in advance by experiments and is stored in the controller 702. The determination value is for example 4 kPa. The determination value may be changed based on an estimated purge flow rate estimated to pass through the purge control valve 634 per unit time (such as one minute) from the purge control valve 634. Specifically, the controller 702 may firstly identify the estimated purge flow rate. The controller 702 may identify the estimated purge flow rate from a data map (not shown) identified in advance by experiments and stored in the controller 702 by using the duty ratio of the purge control valve 634 and the detection value of the pressure sensor 616 in the case of being in the non-communication state by the purge control valve 634. The estimated purge flow rate may be a purge flow rate in the case where the second hose 626 is not detached from the intake pipe IP.

In a case where the pressure variation ΔP is smaller than the determination value (NO in S106), the controller 702 outputs a signal indicating a possibility that the second hose 626 is detached from the intake pipe IP to the indicator of the vehicle in S108 and terminates the present process. When the signal is inputted, the indicator of the vehicle outputs a display indicating the possibility that the second hose 626 is detached from the intake pipe IP. Due to this, the driver can acknowledge the possibility that the second hose 626 is detached from the intake pipe IP.

On the other hand, in a case where the pressure variation ΔP is greater than the determination value (YES in S106), S108 is skipped and the present process is terminated. In the case where the pressure variation ΔP is greater than the determination value, the second hose 626 can be determined as not being detached from the intake pipe IP.

According to this configuration, whether the second hose 626 is detached from the intake pipe IP or not can be determined by using the pressure variation ΔP on the upstream side of the purge control valve 634. Upon detecting the pressure variation ΔP, the pump 612 may be driven. In this configuration, the pressure difference between the upstream and downstream of the purge control valve 634 in the case where the second hose 626 is not detached from the intake pipe IP can be increased. As a result, the pressure variation ΔP for the case where the second hose 626 is not detached from the intake pipe IP can be made larger, and the determination on whether the second hose 626 is detached from the intake pipe IP or not can be made easier.

Seventh Embodiment

Figure 17:
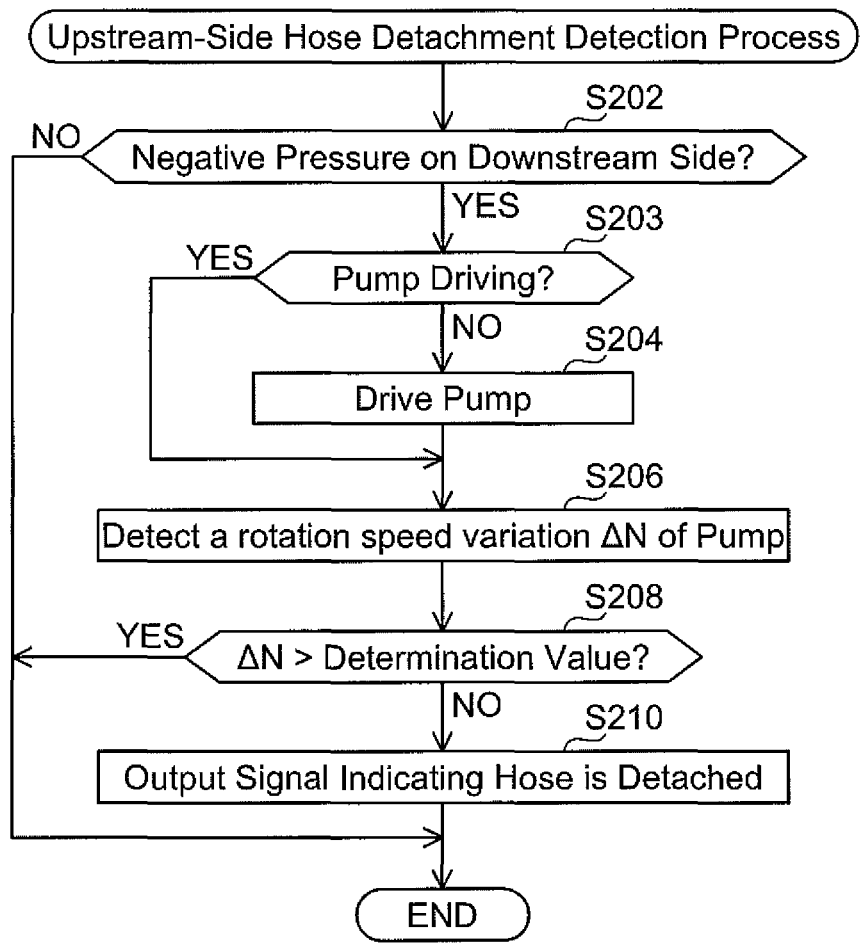
FIG. 17 shows a flowchart of an upstream-side hose detachment detection process of a seventh embodiment.

Points in a seventh embodiment that are different from those in the sixth embodiment will be described. In the seventh embodiment, contents of the upstream-side hose detachment detection process that the controller 702 performs are different. In this embodiment, the pressure sensor 616 may not be arranged. As shown in FIG. 17, in this process, firstly in S202, the controller 702 determines whether the pressure in the intake pipe IP on the downstream side of the supercharger CH is the negative pressure, similar to S102. In a case where the pressure in the intake pipe IP on the downstream side of the supercharger CH is not the negative pressure (NO in S202), the present process is terminated.

On the other hand, in determining that the pressure in the intake pipe IP on the downstream side of the supercharger CH is the negative pressure (YES in S202), then in S203, the controller 702 determines whether the pump 612 is driving or not. In the case where the pump 612 is not driven (NO in S203), the controller 702 drives the pump 612 with a preset current value (such as 2.0 A) in S204 and proceeds to S206. On the other hand, in the case where the pump 612 is already driving (YES in S203), S204 is skipped and the process proceeds to S206.

In S206, the controller 702 detects a rotation speed variation ΔN of the pump 612 for the period during which the purge control valve 634 is subjected to the duty control. Specifically, rotation speed of the pump 612 varies according to the pressure in the third hose 622. Resistance against rotation of the pump 612 is greater with a higher pressure in the third hose 622, and the rotation speed thereby drops. The controller 702 calculates a difference between an average of the rotation speed on a high-rotation side (that is, the pressures in the case of being in the communication state by the purge control valve 634) and an average of the rotation speed on a low-rotation side (that is, the pressures in the case of being in the non-communication state by the purge control valve 634) in the pump 612 for the period during which the purge control valve 634 is subjected to the duty control.

Next, in S208, the controller 702 determines whether the rotation speed variation ΔN is greater than a preset determination value. The determination value is identified in advance by experiments and is stored in the controller 702. The determination value is for example 200 rpm. The determination value may be changed based on the estimated purge flow rate estimated to pass through the purge control valve 634 per unit time (such as one minute) from the purge control valve 634.

In a case where the rotation speed variation ΔN is smaller than the determination value (NO in S208), the controller 702 outputs the signal indicating the possibility that the second hose 626 is detached from the intake pipe IP to the indicator of the vehicle in S210 and terminates the present process. When the signal is inputted, the indicator of the vehicle outputs the display indicating the possibility that the second hose 626 is detached from the intake pipe IP.

On the other hand, in a case where the rotation speed variation ΔN is greater than the determination value (YES in S208), S210 is skipped and the present process is terminated. In the case where the rotation speed variation ΔN is greater than the determination value, the second hose 626 can be determined as not being detached from the intake pipe IP.

According to this configuration, whether the second hose 626 is detached from the intake pipe IP or not can be determined by using the rotation speed variation ΔN of the pump 612. Due to this, the pressure sensor 616 does not have to be provided. In the upstream-side hose detachment detection process, the pump 612 may be driven at constant rotation speed (such as 12000 rpm), and the determination on whether the second hole 626 is detached from the intake pipe IP or not may be determined according to a variation in the electric power, such as a variation in current flowing in the pump 612. The resistance against the rotation of the pump 612 is greater with the higher pressure in the third hose 622, and the current value increases in order to maintain the rotation speed at the constant value. The determination on whether the second hose 626 is detached from the intake pipe IP or not may be made by making use of this.

As above, the embodiments of the present invention have been described, however, these are merely examples, and do not intend to limit the scope of claims. The techniques described in the scope of claims include various alterations and variants of the embodiments described above.

Figure 10:
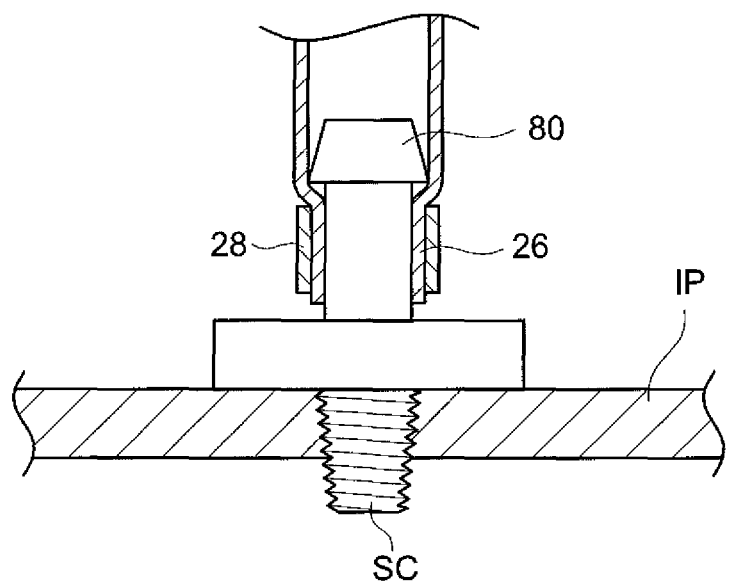
FIG. 10 is a schematic vertical cross-sectional view showing a configuration of a connecting portion of a hose and an intake pipe of a variant.
Figure 11:
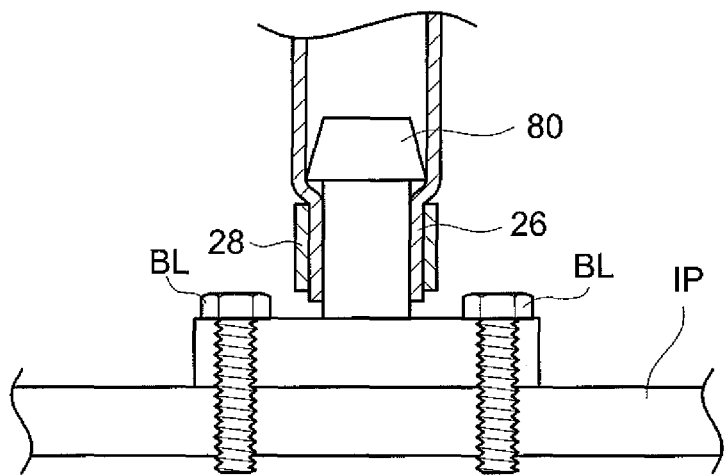
FIG. 11 is a schematic vertical cross-sectional view showing a configuration of a connecting portion of a hose and an intake pipe of a variant.
Figure 12:
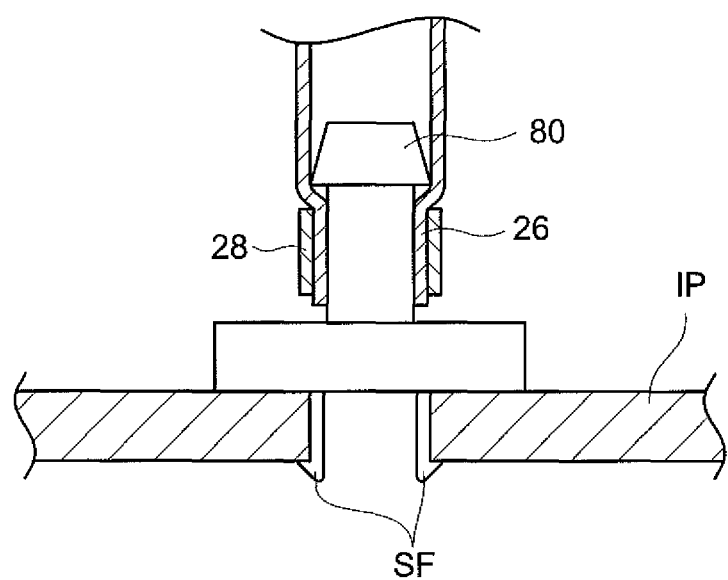
FIG. 12 is a schematic vertical cross-sectional view showing a configuration of a connecting portion of a hose and an intake pipe of a variant.

In each of the embodiments above, the check valve 80 is fabricated integrally with the intake pipe IP. However, the check valve 80 may be fabricated separately from the intake pipe IP and may be fixed to the intake pipe IP. For example, as shown in FIG. 10, the check valve 80 may be fixed to the intake pipe IP by a screw SC. Alternatively, as shown in FIG. 11, the check valve 80 may be fastened to the intake pipe IP by bolts BL. Further, alternatively, as shown in FIG. 12, the check valve 80 may be inserted to an opening of the intake pipe IP and may be fixed by a snap fitting SF that engages with an inner circumferential surface of the intake pipe IP.

In the first and second embodiments above, the supercharger CH is arranged. However, the supercharger CH may not be arranged.

In each of the embodiments above, the hoses (such as the first hose 24) are connected respectively to the intake pipe IP on the upstream side and the downstream side of the throttle valve TV. However, the hoses may be connected only on the upstream side of the throttle valve TV. That is, the gas pipe 32 and the like may not be branched.

In each of the embodiments above, the gas pipe (such as the gas pipe 32) is constituted of the flexible material over an entire length thereof. However, a part of the gas pipe may be fabricated by a material with low flexibility, for example, stainless steel and aluminum alloy.

In the first, third, and fourth embodiments above, the pump (such as the pump 12) is arranged. However, the pump may not be arranged. At this occasion, the hose detachment detection process that uses the pump (such as the upstream-side hose detachment detection process in FIG. 5) may not be performed.

In the sixth and seventh embodiments above, the pump (such as the pump 612) is arranged. However, the pump may not be arranged. For example, a gas generation source itself may be provided with a function to boost the gas.

In the sixth and seventh embodiments above, the evaporated fuel processing device 600 is an example of a "vehicle gas processing device". However, the techniques of the sixth and seventh embodiments may be applied to the exhaust gas recirculation system 400 of the fourth embodiment and the blowby gas processing system 500 of the fifth embodiment. In these cases, each of the exhaust gas recirculation system and the blowby gas processing system is an example of the "vehicle gas processing device".

In the sixth and seventh embodiments above, the supercharger CH is arranged. However, the supercharger CH may not be arranged.

In the sixth and seventh embodiments above, the first hose 624 is connected to the intake pipe IP on both the upstream side and the downstream side of the throttle valve TV. However, the hose may be connected only on the upstream side of the throttle valve TV. Alternatively, the hose may be connected only on the downstream side of the throttle valve TV. That is, the gas pipe 632 may not be branched.

In the sixth and seventh embodiments above, the gas pipe (such as the gas pipe 632) is constituted of the flexible material over an entire length thereof. However, a part of the gas pipe may be fabricated by the material with low flexibility, for example, stainless steel and aluminum alloy.

Further, the technical features described in the description and the drawings may technically be useful alone or in various combinations, and are not limited to the combinations as originally claimed. Further, the technique described in the description and the drawings may concurrently achieve a plurality of aims, and technical significance thereof resides in achieving any one of such aims.

The invention claimed is:

1. A vehicle gas processing device configured to supply gas generated by a vehicle to an intake pipe of a combustion engine, the device comprising:
   a gas pipe configured to communicate a gas generation source to the intake pipe, the gas pipe having a flexible end at least at an intake pipe side of the gas pipe;
   a check valve configured to be disposed between the intake pipe and the gas pipe, and configured to allow the gas to flow from the gas pipe toward the intake pipe and prohibit the gas to flow from the intake pipe toward the gas pipe; and
   a determining unit configured to determine that the gas pipe is detached from the check valve,
   wherein
   the check valve is fixed to the intake pipe,
   the gas pipe is detachably attached to the check valve,
   the gas pipe branches into an upstream branch pipe and a downstream branch pipe at a point between the gas generation source and the intake pipe, the upstream branch pipe being connected to the intake pipe at an upstream side of a throttle valve, the downstream branch pipe being connected to the intake pipe at a downstream side of the throttle valve,
   the upstream branch pipe has flexibility and is detachably attached to the check valve, and
   the determining unit is configured to determine that the upstream branch pipe is detached from the check valve, in a case where the determining unit determine when the combustion engine is driving and a supercharger arranged on the upstream side of the throttle valve is not operating that the intake pipe has a negative pressure on the downstream side of the throttle valve, and the determining unit configured to determine when a detection result of an air-fuel ratio sensor arranged in an exhaust pipe of the combustion engine is leaner than a preset reference ratio that an air-fuel ratio of the combustion engine is leaner than the reference ratio.

2. A vehicle gas processing device configured to supply gas generated by a vehicle to an intake pipe of a combustion engine, the device comprising:
   a gas pipe configured to communicate a gas generation source to the intake pipe, the gas pipe having a flexible end at least at an intake pipe side of the gas pipe;
   a check valve configured to be disposed between the intake pipe and gas pipe and configured to allow the gas to flow from the gas pipe toward the intake pipe and prohibit the gas to flow from the intake pipe toward the gas pipe;
   a determining unit configured to determine whether the gas pipe is detached from the check valve; and
   a switch valve configured to switch between a communication state in which the gas generation source and the intake pipe are communicated through the gas pipe and a non-communication state in which the gas generation source and the intake pipe are not communicated through the gas pipe,
   wherein
   the check valve is directly fixed to the intake pipe without any pipe interposed therebetween,
   the gas pipe is detachably attached to the check valve, and
   the determining unit is configured to:
     detect a pressure variation in the gas pipe between the gas generation source and the switch valve; and
     determine whether the gas pipe is detached from the check valve using a difference between a pressure between the gas generation source and the switch valve in the communication state and a pressure between the gas generation source and the switch valve in the non-communication state based on the detected pressure variation in the gas pipe between the gas generation source and the switch valve when the communication state and the non-communication state are switched consecutively by the switch valve.

3. The vehicle gas processing device as in claim 2, wherein
   the determining unit comprises a pressure sensor disposed on the gas pipe between the gas generation source and the switch valve.

4. The vehicle gas processing device as in claim 2, the device further comprising:
   an electric pump disposed on the gas pipe,
   wherein
   the determining unit is configured to determine the pressure variation in the gas pipe between the gas generation source and the switch valve by detecting at least one of a variation in a rotation speed of the electric pump and a variation in the electric power supplied to the electric pump when the communication state and the non-communication state are switched consecutively by the switch valve under a condition where the electric pump is boosting the gas between the gas generation source and the switch valve in the non-communication state.

* * * * *